June 15, 1965

H. L. RANDOLPH 3,189,713

DUAL ELEMENT THERMOSTATIC CONTROL HAVING CALIBRATION MEANS

Filed Feb. 5, 1962

INVENTOR.
HOLLIS LEE RANDOLPH

BY Mead, Browne, Schuyler & Beveridge

ATTORNEYS.

June 15, 1965      H. L. RANDOLPH      3,189,713
DUAL ELEMENT THERMOSTATIC CONTROL HAVING CALIBRATION MEANS
Filed Feb. 5, 1962      3 Sheets-Sheet 2

INVENTOR.
HOLLIS LEE RANDOLPH
BY
Mead, Browne, Schuyler, & Beveridge
ATTORNEYS.

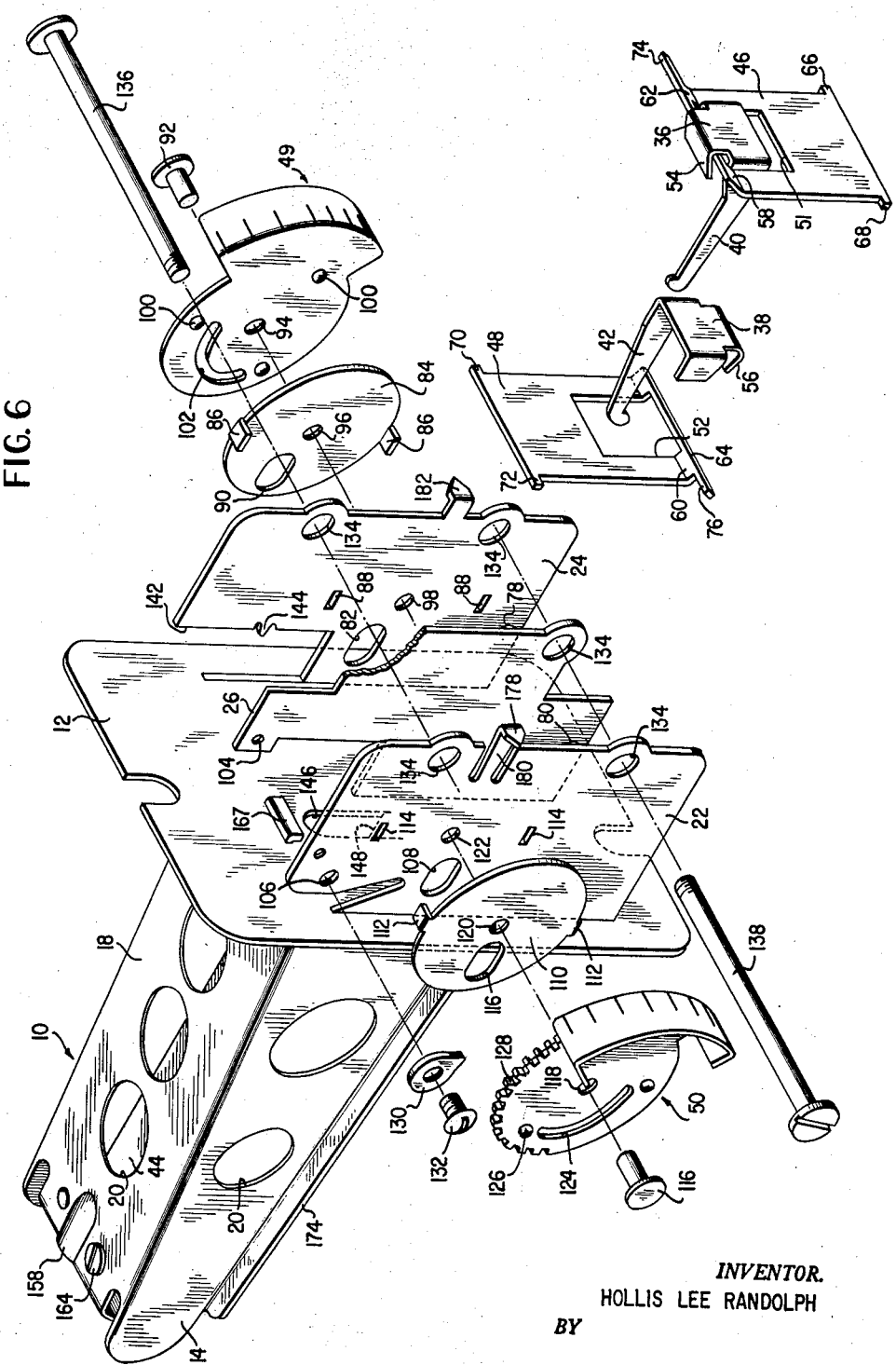

United States Patent Office 3,189,713
Patented June 15, 1965

3,189,713
DUAL ELEMENT THERMOSTATIC CONTROL
HAVING CALIBRATION MEANS
Hollis Lee Randolph, Lakewood, Calif., assignor to Robertshaw Controls Company, Richmond, Va., a corporation of Delaware
Filed Feb. 5, 1962, Ser. No. 171,210
9 Claims. (Cl. 200—138)

This invention relates to control devices of the type in which one or more switches are operated by a condition responsive element.

The device of the invention is of the type suitable for controlling a hot air heating system in which a fan operates to force heated air through the ducts of the system. In such systems, a fan switch and a high limit switch are actuated in response to the temperature of the air, with the fan switch actuated when the air is heated to a certain temperature to start the fan into operation. Should the air temperature increase to an excessive amount, the high limit switch is actuated to shut down the heating system.

It is an object of this invention to provide a fan control switch of simplified construction, having a minimum number of parts, and which can be easily assembled.

A further object is to provide a combination thermostatic control device having improved calibration means for setting the operating range of the device.

The objects are attained by the provision of a pair of electrical switches having conventional operating plungers to open and close the switch contacts. Actuating levers are associated with a bimetal element in such a manner that deflection of the bimetal in one direction due to temperature changes depresses one of the switch plungers, and deflection of the bimetal in the other direction actuates the plunger of the other switch.

For selecting the temperature at which each of the switches will be actuated, the actuating levers are fulcrumed about the free ends of a pair of adjustment links which are pivotally mounted for movement in the path of the switch plungers. Adjustment dials are provided with cam slots which are interengaged with the free ends of the links. Rotation of the adjustment dials changes the position of pivotal axis of the actuating levers relative to the switch plungers thereby requiring a greater or lesser amount of bimetal deflection to actuate the switches. Omission of either of the switches permits the device to be employed as a separate control for a single switch.

Other objects and advantages will become apparent from the following description taken in connection with the accompanying drawings in which:

FIG. 6 is an exploded perspective view of the control with the switches omitted;

Figure 1:
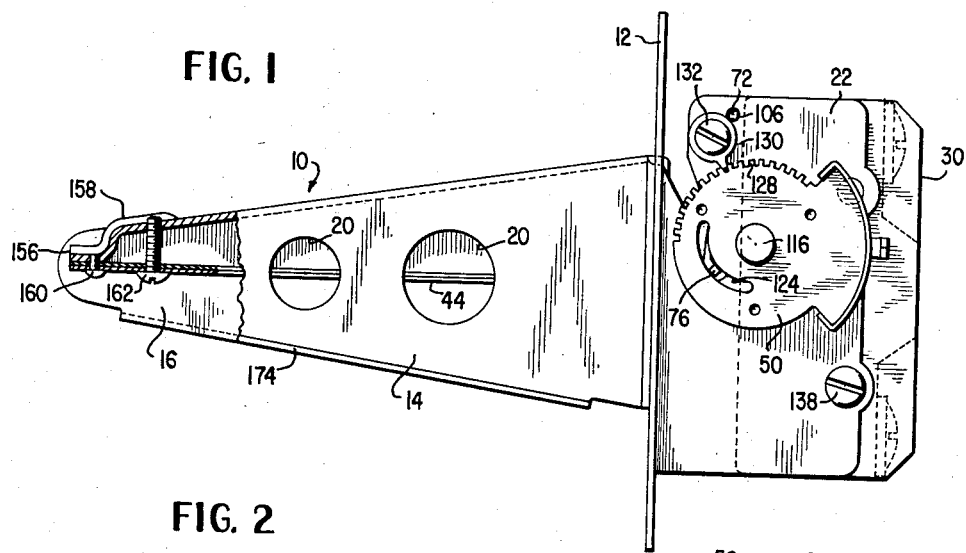
FIG. 1 is a front elevation view of a fan and limit control with certain portions broken away embodying the invention in its preferred form.

The general arrangement of the device will be briefly described with reference first to FIGS. 1 through 5 wherein a frame 10 is illustrated mounted on base plate 12. Frame 10 is U-shaped in cross-section having side members 14 and 16 and a top member 18. To insure even distribution of air to the thermostatic control element in the frame, a plurality of openings 20 are provided in the top and side members. Side members 14 and 16 extend through the openings in the base plate to form side extensions 22 and 24, respectively. Mounted on the base plate intermediate side extensions 22 and 24 is a barrier plate 26.

Mounted between the side extensions and barrier plate are a pair of switches 28 and 30. Switch 28 is a fan controlling switch and is actuated by depression of an operating plunger 32 which projects from the switch casing toward base plate 12. Fan switch 28 is of the type in which the switch contacts are opened when its plunger is extended; depression of the plunger toward the switch casing closing the switch to start the fan into operation.

Switch 30 is a high limit switch and is actuated by an operating plunger 34. Plunger 34 also projects toward base plate 12. High limit switch 30 operates in reverse from the fan switch in that depression of plunger 34 opens the switch contacts to break the circuit, the contacts being closed when the plunger is in its neutral, extended position. Switch 30 is connected with a fuel control valve or the like, and operates to shut down the heating system when plunger 34 is depressed. Plungers 32 and 34 are positioned near one end of their respective switches 28 and 30, and the switches are mounted on opposite sides of barrier plate 26 with plungers 32 and 34 being disposed in opposite directions, that is, plunger 32 is nearer to one end of base plate 12 and plunger 34 is nearer the opposite end.

Figure 2:
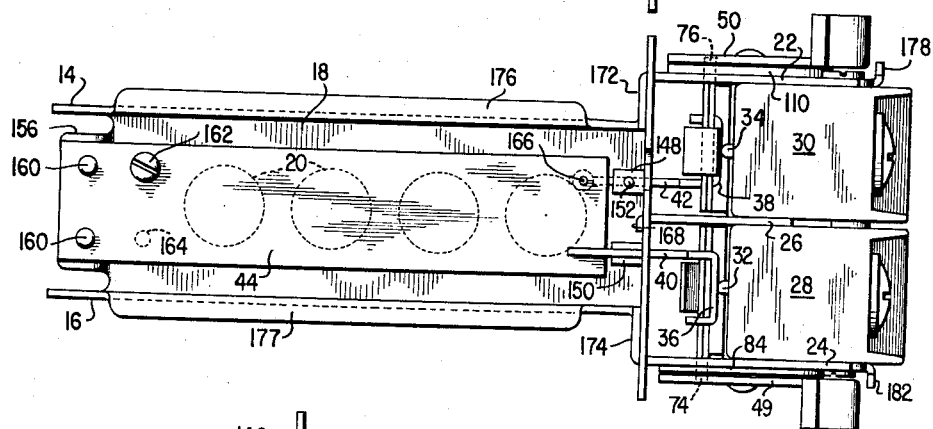
FIG. 2 is a bottom view of the control.
Figure 5:
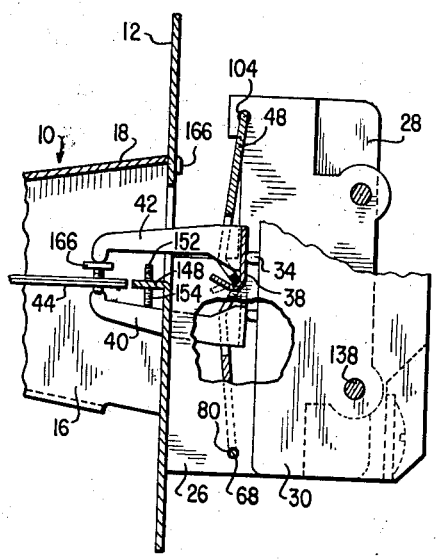
FIG. 5 is a sectional view taken on line 5—5 of FIG. 4.

As is more clearly illustrated in FIGS. 2 and 5, switch plungers 32 and 34 are actuated by a pair of levers 36 and 38, respectively, which are pivoted for movement in a path to depress the plunger. Levers 36 and 38 are provided with actuating arms 40 and 42, respectively, which as seen in FIG. 5 or oppositely disposed relative to each other so that clockwise movement of actuating arm 42 depresses plunger 34, while counter-clockwise movement of actuating arm 40 depresses plunger 32 of fan switch 28.

Actuation of the switches is accomplished by a bimetal element 44 having one end fixedly mounted adjacent the end of the frame with its free end positioned between actuating arms 40 and 42. Deflection of the bimetal in one direction will depress one of the switch plungers, while deflection in the other opposite direction will depress the other switch plunger. In the position illustrated in FIG. 5, the high expansion side of bimetal element 44 is the lower side so that heating of the bimetal causes the end to deflect upward in the direction to cause lever 38 to pivot clockwise toward plunger 34 of the high limit switch 30. Conversely, decreases in temperature cause the bimetal to deflect downward in FIG. 5 in a direction which will cause counter-clockwise rotation of lever 40 which tends to depress plunger 32 of a fan switch 28. Accordingly, when the temperature is low, plunger 32 of the fan switch is depressed to shut off the fan, while plunger 34 of the high limit switch 30 is extended to maintain the circuit controlled by the high limit switch closed. As the temperature increases, the fan switch 28 closes to start the fan into operation, and should the temperature increase beyond a desirable limit, bimetal element 44 will move upwardly until plunger 34 is depressed to shut down the heating system.

In order to adjust the control point of switches 28 and 30, that is, the temperature at which plungers 32 and 34 will be depressed by their respective levers 36 and 38, mechanism is provided for manually adjusting the position of levers 36 and 38 relative to the switches so that a greater or lesser amount of deflection of bimetal 44 is required to actuate the switch plungers. Levers 36 and 38 are pivoted about one edge of a pair of control point adjustment links 46 and 48, respectively (FIG. 4).

Links 46 and 48 are pivotally mounted between barrier plate 26 and side extensions 22 and 24 with the free ends interengaged with cam slots in a pair of manually operable control point adjustment dials 49 and 50. Rotation of dials 49 and 50 shifts the free ends of links 46 and 48 relative to plungers 32 and 34, respectively, to vary the response of the switches to temperature induced deflection of bimetal 44.

Figure 4:
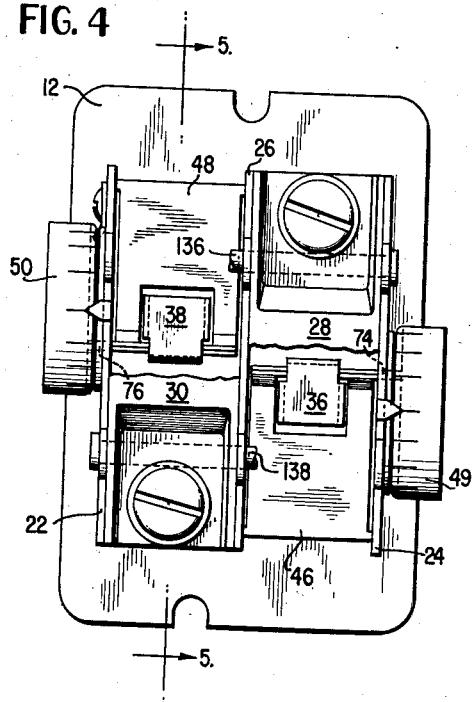
FIG. 4 is a right end view of the device with certain parts broken away.

As shown in FIGS. 4, 5 and 6, levers 36 and 38 are mounted respectively on a pair of adjustment links 46 and 48 (FIG. 6). Links 46 and 48 are metal stampings, and are formed with rectangular openings 51 and 52 respectively. Levers 36 and 38 are respectively provided with bent-over lips 54 and 56. The ends of links 46 and 48 adjacent rectangular openings are bent upwardly at a slight angle, as indicated at 58 and 60, respectively, and levers 36 and 38 are positioned in the rectangular openings with lips 54 and 56 positioned on the upwardly projecting edges 62 and 64 with a line contact. Levers 36 and 38 are therefore fulcrumed about the axis defined by edges 62 and 64.

Formed at the end of adjustment link 46 remote from opening 51 is a pair of laterally projecting pivot tabs 66 and 68. Similar tabs 70 and 72 are formed at the corresponding edge of link 48. Extending laterally from the edge of link 46 which defines pivot axis 62 is a cam follower projection 74. Adjustment link 48 is provided with a corresponding cam follower projection 76.

Pivot tabs 66 and 68 of link 46 are received respectively in apertures 78 and 80 in side extension 24 and barrier plate 26, and cam follower projection 74 projects through an enlarged opening 82 formed in side extension 24. End 62 of link 46 is thus pivotally movable above tabs 66 and 68 to the extent afforded by the size of opening 82.

Mounted on the outer side of side extension 24 is a circular bearing plate 84 which is secured to side extension 24 by mounting tabs 86. Tabs 86 cooperate with slots 88 in side extension 24. Bearing plate 84 is provided with an enlarged opening 90 which mates with opening 82. Bearing plate 84 is provided to reduce wear between fan dial 49 and side extension 24, since frame 10 is preferably of aluminum or other soft metal having good heat conductivity, while bearing plate 84 and dial 49 are of steel or other hard metal.

Fan dial 49 is rotatably secured to side extension 24 by a rivet 92 which is received in cooperating openings 94, 96 and 98 in dial 49, bearing plate 84 and side extension 24, respectively. Dimples or depressions 100 project from the inner face of dial 49 and cooperate with the outer face of plate 84, to provide a frictional resistance to rotation of dial 49.

For pivotally adjusting the position of link 46, cam follower 74 is received in an arcuate cam slot 102 formed in fan dial 49, which overlies the matched openings 82 and 90 in side extension 24 and bearing plate 84, respectively. Cam slot 102 is so designed that rotation of dial 49 clockwise, as viewed in FIG. 3, acts through cam follower 74 to cause counterclockwise rotation of adjustment link 46 about its pivotal axis at tabs 66 and 68. This action moves lever 36 toward plunger 32 of fan switch 28 so that less pivotal movement of lever 36 is required to press plunger 32.

High limit adjustment link 48 is disposed on the opposite side of barrier plate 26 from link 46 with its pivot tabs 70 and 72 received in openings 104 and 106 in barrier plate 26 and side extension 22, respectively. Cam follower 76 is received in an enlarged opening 108, similar to opening, 82, formed in side extension 22. Secured to the outer side of side extension 22 is a bearing plate 110 having mounting tabs 112 which are received in slots 114 on the side extension. An enlarged opening 116 in bearing plate 110 cooperates with opening 108. High limit adjustment dial 50 is rotatably secured to side extension 22 by rivet 116 which is received in cooperating apertures 118, 120 and 122 in dial 50, bearing plate 110, and side extension 22, respectively. Cam follower 76 projects through matched openings 108 and 116 for engagement with the arcuate cam slot 124 formed in high limit dial 50. Dimples 126 are provided in dial 50 for frictional engagement with bearing plate 110. Bearing plate 110 protects side extension 22 from galling as could occur from rotation of dial 50, in the manner previously described with reference to dial 49 and bearing plate 84.

High limit adjustment dial 50 is provided with serrations 128 at its periphery for cooperation with a single saw tooth projection of a limit stop 130. After proper calibration of the "Limit Off" temperature setting, limit stop 130 is positioned to fix dial 50 against rotation. Limit stop 130 is positioned relative to the serrations, after which screw 132 is tightened to secure limit stop 130 in position on side extension 22.

As viewed in FIG. 1 cam slot 124 is so designed that clockwise rotation of dial 50 causes cam follower 76 to move upwardly, or to the right as seen in FIG. 1 causing counterclockwise rotation of adjustment link 48 about pivot tabs 70 and 72. Counterclockwise rotation of high limit adjustment link 48 shifts the pivotal axis of lever 38 toward plunger 34 of the high limit switch which decreases the temperature at which plunger 34 will be depressed.

Aligned openings 134 are provided in barrier plate 26 and side extensions 22 and 24 for receiving bolts 136 and 138. Bolts 136 and 138 extend through openings in the casings of switches 28 and 30 for mounting the switches on the base plate and side extensions.

Switches 28 and 30 are switches presently being marketed and their details form no part of this invention. Both the high limit switch 30 and fan switch 28 are of the type in which depression of their operating plungers snap actuates the contacts to an open or closed position. Operating plungers 32 and 34 are biased to extend from their switch casings.

Figure 3:
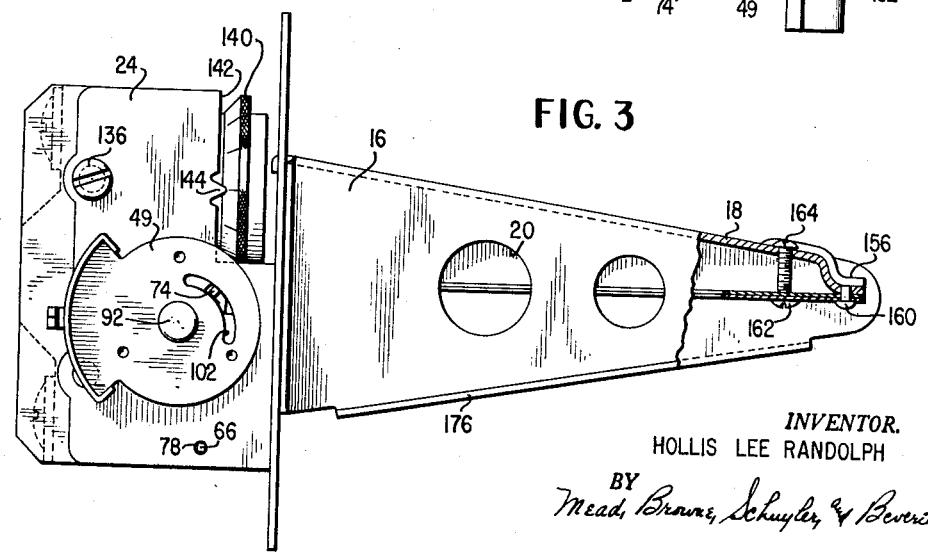
FIG. 3 is a rear view with portions broken away.

Fan switch 28 is provided with a temperature differential dial mechanism for adjusting the force required to depress plunger 32. This mechanism is controlled by a temperature differential dial 140 (FIG. 3) which is accessable through an opening 142 cut out of side extension 24 (FIGS. 3 and 6). For cooperating with the temperature differential marking on dial 140, an indicating pointer 144 is formed on side extension 24. The amount of temperature differential between the "fan on" and "fan off" temperatures can be adjusted by rotation of temperature dial 140 to the indicated reading.

Lever 42 extends through an elongate opening 146 in base plate 12 (FIGS. 5 and 6). Opening 146 is cut out from base plate 12 and a portion of the metal is bent downwardly to form a stop tab 148. A similar opening is provided on the opposite side of barrier plate 26 for lever 40 and forms a stop tab 150 (FIG. 2). Threadly mounted in tab 148 is a limit screw 152. Limit screw 152 is positioned in the path of lever 42 and restricts the movement of lever 142 in a counterclockwise direction as viewed in FIG. 5. Lever 42 is therefore prevented from exerting a force on the end of bimetal element 44 after the high limit switch is off due to the force of plunger 34 acting on lever 38. Tab 150 likewise receives a limit screw 154 for restricting the movement of actuating arm 40 after plunger 32 of switch 28 is extended upon movement of bimetal element 44 away from actuating arm 40. Limit screws 152 and 154 permit actuating arms 42 and 40 to move sufficiently to permit the switch plungers to fully extend from their casings, but prevent the actuating arms from interfering with each other or bimetal element 44.

For securing bimetal element 44 to frame 10, top member 18 of frame 10 is provided with an offset tongue portion 156 (FIGS. 1 to 3). A stiffening bead 158 extends from tongue portion 156 over a portion of the length of top member 18. Bimetal element 44 has its end secured to tongue portion 156 by a pair of rivets 160. Freely passing through an opening in bimetal 44 is a set screw 162 which is threadedly engaged in top member 18 of frame 10. Set screw 162 can be adjusted to exert an upward force on bimetal 44 as viewed in FIGS. 1 and 3. For exerting a downward force on the bimetal element, a set screw 164 is threadedly engaged from above in top member 18 with its lower end contacting bimetal element 44. Set screw 162 and 164 combine to provide a means by which bimetal element 44 can be positioned and held in place during temperature calibration, after which the setting is maintained by the use of a suitable sealing material on the screw threads. Threadedly mounted on the free end of the bimetal element 44 for engagement with the end of actuating arm 42 is a high limit calibration screw 166, which after proper adjustment is also held in place by the use of a resinous sealing material on the thread.

Base plate 12 and frame member 10 are assembled together by inserting side extensions 22 and 24 through properly formed slots in the base member, the side extensions sliding to the rear of the slots so as to lock in place with the end of the slot, and a tab 167 formed at the end of top wall member 18 of frame 10 is inserted into a slot in the base plate and bent over as indicated in FIGS. 5 and 6 to hold frame 10 in place on base member 12. Barrier plate 26 is provided with tabs 168 which cooperate with slots in base plate 12 (FIG. 2) the tabs being bent over on the underside of the base plate. Side extensions 22 and 24 are offset at 172 and 174 respectively (FIG. 2) from side members 14 and 16 of frame 10. Side members 14 and 16 are preferably provided with flanges 176 and 177 respectively to provide the required amount of stiffness.

Formed on side extension 22 is a limit off dial pointer 178, having a relatively long stem 180, which can be bent, in a manner to be described below, for correlating the indicated temperature on dial 50 with the calibration of bimetal element 44. Side extension 24 is provided with a dial pointer 182 for cooperation with markings on dial 49.

The procedure for calibrating the control will now be described. After setting fan dial 49 to a desired temperature setting, the control is exposed to a bath temperature matching this setting. Set screws 162 and 164 are then adjusted so as to just allow fan switch 28 to come "on" at this setting. Assuming that the bimetal was flexed downward to begin with, so as to depress plunger 32 holding fan switch 28 open, set screws 162 and 164 would be retracted upwardly (FIGS. 1 and 3) until the point is reached where the resulting rotation of lever 36 allows the spring action of fan switch plunger 32 to open the switch with a snap action. At this point fan switch 32 is in calibration and set screws 162 and 164 are sealed in place. Adjusting screw 154 is adjusted in tab 150 after calibration of the fan switch so that over-travel of actuating arm 40 is prevented after fan switch 32 is in its "on" position.

After immersion of bimetal element 44 in a bath at the temperature desired for actuation of the limit off switch 30, dial 50 is rotated to the corresponding dial marking and limit stop 130 is locked into place by tightening screw 132. Calibration screw 166 is then adjusted so that its contact with actuating arm 42 rotates lever 38 sufficiently to depress plunger 34 until high limit switch 30 snaps to the "off" position. After the proper position of calibration screws 166 has been determined it is sealed in position to maintain the calibration.

For additional calibration of the limit off switch, stem 180 of pointer 178 can be bent to bring the limit "off" temperature and dial 50 reading into agreement. Limit screw 152 is adjusted to restrict the movement of actuating arm 42 beyond the "On" position for the limit off switch 30. By properly setting limit screw 152 and 154, the control may operate independently as a fan switch, or as a high limit switch without influence of one switch upon the other.

After the control has been properly calibrated and installed in the air duct of a forced air furnace the device operates as follows:

Upon installation with the heat off, bimetal element 44 is so positioned as to be deflected downward as viewed in FIG. 5 with its free end holding fan switch plunger 32 depressed shutting off the fan. Upon heating, as the furnace is placed in operation, the free end of bimetal element 44 deflects upwardly permitting fan switch lever 40 to rotate clockwise on its fulcrum as shown in FIG. 5, due to the spring force of switch plunger 32. As the fan "On" temperature is reached, as determined by the setting of dial 49, bimetal element 44 has moved sufficiently to permit switch plunger 32 to reach its extended or "On" position. The furnace fan then operates to force warm air through the duct.

In normal operation the room thermostat serving the forced air furnace becomes satisfied shutting off the furnace. Fan switch 28 remains in the "On" position until the air temperature surrounding bimetal element 44 has become cooled sufficiently to deflect the free end of the bimetal element downward to a point where its force is sufficient to cause lever 36 to depress plunger 32 and shut off the fan.

Assuming that the original fan "On" setting was at a mid-point of dial 49, rotation of the fan dial 49 clockwise as shown in FIG. 3, acts through cam slot 102 to rotate adjustment link 46 counter-clockwise about its pivot at aperture 78. This moves the fulcrum of lever 36 closer to plunger 32 thereby requiring a greater degree of upward deflection bimetal element 44 in order to reach the fan "On" position for plunger 32. This results in a higher fan "On" setting. Conversely, rotation of fan dial 49 in a counter-clockwise direction results in moving the fulcrum of lever 36 away from plunger 32 and lowers the fan "On" setting temperature. Accordingly, limit screw 154 in tab 150 must be adjusted to permit sufficient movement of actuating arm 40 to allow the switch plunger 32 to reach its "On" position at the maximum position for the fan "On" setting. Movement beyond this point for the actuating arm 40 can be prevented by proper adjustment of limit screw 154. Further adjustment of the differential between the fan "On" and fan "Off" temperature is accomplished by proper adjustment of temperature differential dial 140 which determines the necessary amount of force to depress plunger 32.

In the event some component of the system should fail, such as the room thermostat or fan resulting in excessive temperature in the ducts, the high limit switch becomes the controlling element. Referring to FIGS. 1, 2 and 5, as the high limit temperature setting is reached the free end of bimetal element 44 is deflected upwardly (FIG. 5) to cause clockwise rotation of lever 38 about its fulcrum on adjustment link 48. Lever 38 rotates until high limit switch plunger 34 is depressed to open the contacts of switch 30. The opening of high limit switch 30 causes closure of a control element, such as a solenoid gas valve, shutting off the furnace.

Rotation of high limit dial 50 in a clockwise direction as shown in FIG. 1, causes cam slot 124 to act on cam follower 76 and rotate adjustment link 48 counter-clockwise about its pivotal axis at apertures 104 and 106. This action moves the fulcrum of lever 38 toward switch plunger 34, thereby requiring less upward deflection of bimetal element 44 to cause limit off switch 30 to open, and a result lowers the high limit setting. Limit screw 152 is adjusted so as to permit closure of switch 30 for the minimum "limit off" setting but to prevent overtravel beyond this point to prevent actuating arm 42 from engaging bimetal element 44 and influencing the action of fan switch 28.

For both dials 49 and 50, the contour of cam slots 102 and 124, respectively, is so designed that the movement obtained by rotation of the dial is correlated with bimetal element 44 deflection, so that a change in dial setting with respect to the temperature markings, corresponds to the change in temperature required to cause bimetal element 44 to operate the respective switches. The control can be utilized if desired, either as a combination fan and limit switch as described, or it can be made as either a fan "On" switch alone, or a limit "Off" switch alone, by elimination of one of the switches.

Figure 7:
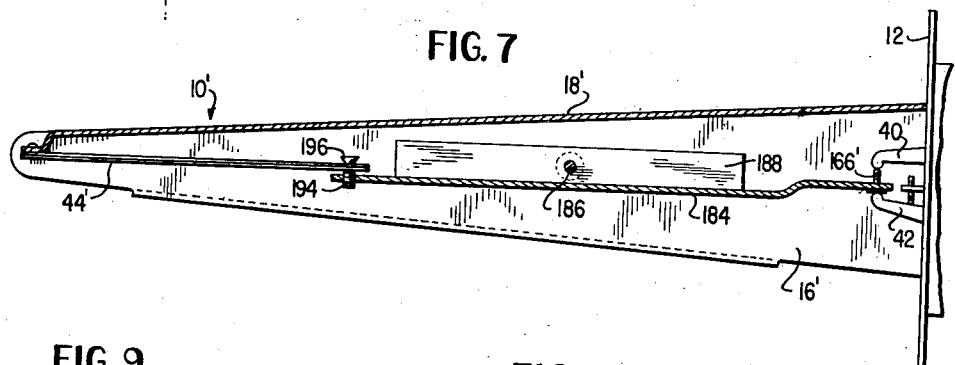
FIG. 7 is a sectional elevation view of a modification.
Figure 8:
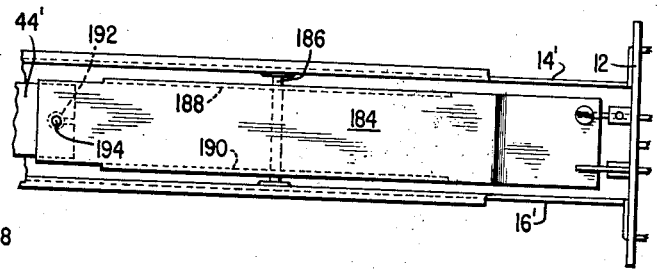
FIG. 8 is a partial bottom view of the device of FIG. 7.

FIGS. 7 and 8 illustrate a modified construction by which the same length of bimetal element can be employed regardless of the length of the frame. Frame 10' (FIG. 7) is of the same general configuration of frame member 10 of the previously described embodiment, and is provided with side members 14' and 16' which correspond respectively to side members 14 and 16 of frame 10. Frame 10' however, exceeds frame 10 in length to the extent that the end of bimetal element 44 would extend only about mid-way of the length of the frame. For transmitting the deflection of bimetal element 44 to actuating arms 40 and 42, a transmitting lever 184 is fulcrumed intermediate its ends on a pin 186 received in appropriately spaced apertures in side members 14' and 16'. Pin 186 extends through openings in side members 188 and 190 of transmitting lever 184. Bimetal element 44' has formed in its free end a keyhole slot 192 (FIG. 8).

Threadedly mounted in the end of transmitting lever 184 adjacent the free end of bimetal element 44' is a set screw 194 having a chamfered groove 196 formed adjacent its head portion. Groove 196 is received in slot 192 of bimetal element 44' and cooperates with the slot to provide free rotational movement with a minimum of lost motion between bimetal element 44' and transmitting lever 184.

At the free end of transmitting lever 184, the high limit calibration screw 166' is adjusted to engage the end of lever 42 in the manner previously described with respect to the embodiment of FIGS. 1 through 6. The slot and screw arrangement on bimetal element 44' and lever 184 provides a minimum of lateral or side movement of transmitting lever 184 so that satisfactory alignment of the switch levers with transmitting lever 184 is maintained. Since the transmitting lever 184 reverses the direction of motion of bimetal element 44', the higher expansion side of the bimetal is on the reverse side of that of FIGS. 1–6 so as to deliver the same direction of motion to the switches. High limit adjustment screw 166' is located at the free end of transmitting lever 184 instead of the bimetal to provide calibration of the high limit switch.

Figure 9:
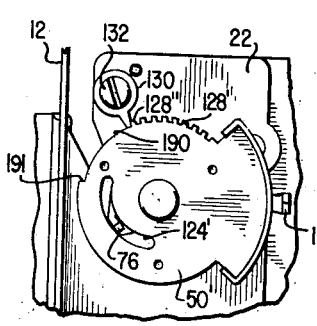
FIG. 9 is a detailed view illustrating a modified "limit off" adjustment dial.

FIG. 9 illustrates a modified form of the high limit adjustment dial for maintaining a maximum high limit temperature setting but at the same time permitting the dial to be rotated to lower high limit settings. Dial 50' is cut back along its periphery to provide an arcuate guide portion 190. One end of guide portion 190 defines a shoulder or abutment 191, and a series of serrations 128' are formed at the other end of guide portion 190 along the periphery of the dial. When limit stop 130 is positioned in guide portion 190, dial 50' may be rotated along the arcuate length of guide portion 190 with limit stop 130 engaging shoulder 191 and the first serration tooth 128" to limit the rotation.

Slight adjustment of the angular position of limit stop 130 about screw 132 is possible to change the angular position of dial 50' relative to pointers 178 at which limit stop 130 engages the ends of guide portion 190. Thus, limited calibration is provided by rotation of limit stop 130. If a fixed temperature setting is desired, limit stop 130 may be engaged with serrations 128' to restrain dial 50' against rotation.

While specific embodiments of the invention have been disclosed for purposes of illustration, these are not intended to limit the invention to the precise construction shown as various alterations and modifications in the structure of the device can be made by those skilled in the art without departing from the scope of the invention as defined in the appended claims.

What is claimed is:
1. A thermostatic control device comprising,
   a frame,
   a control element mounted on the frame having a movable operating plunger,
   a manual adjustment dial rotatably secured to the frame,
   an arcuate cam slot in the adjustment dial,
   an adjustment link having one end pivotally mounted on the frame,
   a lever pivotally mounted on the other end of the adjustment link for pivotal movement in the path of the operating plunger,
   a cam follower on said other end of the adjustment link engaged in the cam slot for adjusting the position of the pivotal axis of the lever upon rotation of the adjustment dial,
   an actuating arm on the lever,
   and a bimetal element having one end secured to the frame and the other end movable in the path of the actuating arm for actuating the operating plunger in response to temperature changes.

2. A thermostatic control device as defined in claim 1 including,
   serrations on the peripheral edge of the adjustment dial,
   and adjustable stop means on the frame selectively engageable with the serrations to restrain rotation of the adjustment dial.

3. A thermostatic control device as defined in claim 1 including,
   an arcuate guide portion on the peripheral edge of the adjustment dial,
   an abutment at one end of the guide portion and a series of serrations at the other end of the guide portion,
   another adjustable stop means on the frame engageable with the guide portion to permit rotation of the dial between the abutment and serrations, and selectively engageable with the serrations to restrain the dial against rotation.

4. A thermostatic control device comprising,
   a frame,
   a control element mounted on the frame having a movable operating plunger,
   a manual adjustment dial rotatably secured to the frame,
   an arcuate cam slot on the adjustment dial,
   an adjustment link having one end pivotally mounted on the frame,
   a lever pivotally mounted on the other end of the adjustment link for pivotal movement in the path of the operating plunger,
   a cam follower on said other end of the adjustment link engaged in the cam slot for adjusting the position of the pivotal axis of said lever upon rotation of the adjustment dial,
   an actuating arm on the lever,
   a transmitting lever pivotally mounted on the frame intermediate its ends,
   one end of the transmitting lever being movable in the path of the actuating arm,
   a bimetal element having one end secured to the frame and the other end pivotally connected to the other end of the transmitting lever for causing pivotal movement of the transmitting lever in response to temperature variations.

5. A thermostatic control device comprising,
   a base plate,
   a frame mounted on one side of the base plate, having a pair of side members extending from the other side of the base plate,
   a pair of switches mounted on the side members each having an operating plunger biased to project from the switch toward the base plate, a pair of levers pivotally mounted on the side members, one of said levers being movable in the path of one of the operating plungers and the other of the levers being movable in the path of the other operating plunger, each of the levers having an actuating arm extending to said one side of the base plate, said actuating arms being movable in opposite directions to move their respective levers into engagement with the operating plungers to depress the plungers, a thermostatic element mounted on the frame for moving one of the actuating arms in one direction in response to an increase in temperature and moving the other of the actuating arms in the opposite direction in response to a decrease in temperature, a pair of manual adjustment dials rotatably secured to the side members, and means connecting one of the levers with one of the dials and the other of the levers with the other of the dials for adjusting the position of the pivotal axes of said levers upon rotation of said dials.

6. The construction defined in claim 5 further including, an adjustable limit stop for each of the actuating arms mounted on said one side of the base plate in the path of movement of the actuating arms to limit the movement of the actuating arms toward each other.

7. A thermostatic control device comprising, a frame, a control element mounted on the frame having a movable operating plunger, an actuating lever mounted on the frame pivotally movable for actuating the operating plunger, a bimetal element having one end secured to the end of the frame remote from the actuating lever and extending in the direction of and terminating at a point spaced from said actuating lever, a transmitting lever pivotally mounted on the frame intermediate its ends between said actuating lever and said bimetal element, said transmitting lever having one end disposed in the path of the actuating lever for actuating the operating plunger and the other end pivotally connected to the free end of said bimetal element, said bimetal element deflecting in response to temperature changes to cause rotation of the transmitting lever about its pivotal mounting to actuate the operating plunger.

8. A thermostatic control device comprising, a frame, a control element mounted on a frame having a movable operating plunger, an actuating lever pivotally mounted on the frame for actuating the operating plunger, a transmitting lever pivotally mounted on the frame intermediate its ends and having one end disposed in the path of the actuating lever for actuating the operating plunger, a set screw mounted in the other end of the transmitting lever having a groove formed therein, a bimetal element having one end secured to the end of the frame remote from the actuating lever and a key hole slot in the other end thereof, said groove being received in the keyhole slot to pivotally connect the bimetal element to the transmitting element, said bimetal element deflecting in response to temperature changes to cause rotation of the transmitting lever to actuate the operating plunger.

9. A thermostatic control device comprising, a frame, a fan switch and a limit switch mounted on the frame each having operating plungers movable between on and off positions to actuate the switches, the operating plunger of the fan switch being biased to extend to the off position and the operating plunger of the limit switch being biased to extend to the on position, a fan switch lever and a limit switch lever pivotally mounted on the frame for movement in a path to depress the fan switch plunger and limit switch plunger, respectively, a thermostatic element mounted on the frame and movable in response to a decrease in temperature to pivot the fan switch lever in a direction to depress the fan switch operating plunger, and movable in response to an increase in temperature to pivot the limit switch lever in a direction to depress the limit switch plunger, and control point adjustment mechanism for adjusting the position of the levers relative to their respective switch plungers to vary the response of the switches to movement of the thermostatic element, said control point adjustment mechanism including, a fan dial and a high limit dial rotatably secured to the frame each having arcuate cam slots formed therein, a fan control point adjustment link having one end pivotally mounted on the frame and the other end interengaged with the cam slot of the fan dial, a high limit control point adjustment link having one end pivotally mounted on the frame and the other end interengaged with the cam slot of the high limit valve, and said fan switch lever and said limit switch lever being pivotally mounted, respectively, on said other ends of the fan control point adjustment link and the high limit control point adjustment link.

References Cited by the Examiner

UNITED STATES PATENTS

| | | | |
|---|---|---|---|
| 1,225,758 | 5/17 | Bristol et al. | 200—139 |
| 1,290,928 | 1/19 | Denison | 200—139 |
| 2,296,063 | 9/42 | Shaw | 200—138 |
| 2,848,582 | 8/58 | Booth | 200—138 |
| 2,891,128 | 6/59 | Bolesky | 200—138 |
| 2,962,049 | 11/60 | Lauterbach | 200—122 |
| 3,062,933 | 11/62 | Burbey et al. | 200—138 |

FOREIGN PATENTS 1,024,155  3/53  France.

BERNARD A. GILHEANY, *Primary Examiner.*